Oct. 31, 1961   T. PETRIDES ET AL   3,007,155
GROUND CONTOUR MAPPING SYSTEM
Filed April 17, 1959   2 Sheets-Sheet 1
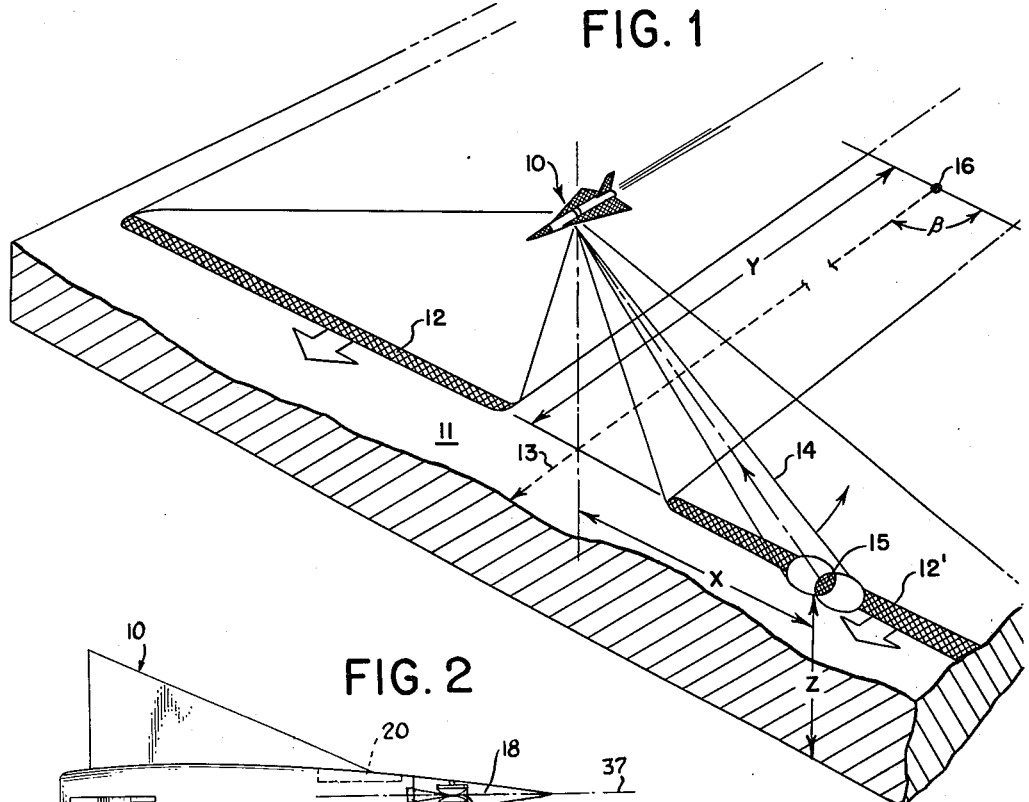
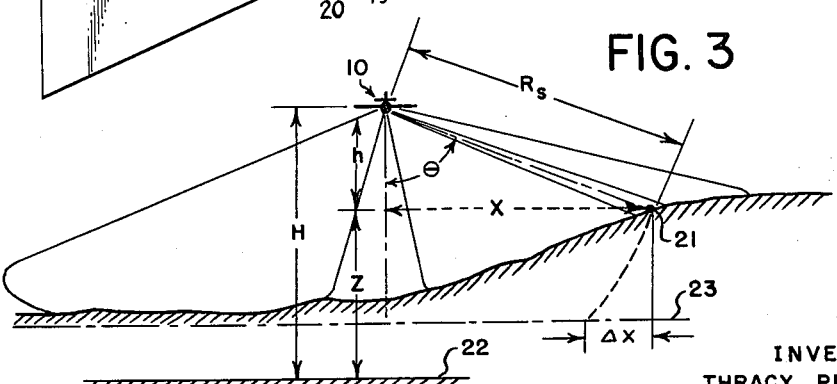
INVENTORS
THRACY PETRIDES
LEVERETT S. TUCKERMAN, JR
AARON M. WINZEMER
BY
ATTORNEYS Oct. 31, 1961    T. PETRIDES ET AL    3,007,155
GROUND CONTOUR MAPPING SYSTEM
Filed April 17, 1959    2 Sheets-Sheet 2

INVENTORS
THRACY PETRIDES
LEVERETT S. TUCKERMAN, JR.
AARON M. WINZEMER
BY
Pennie, Edmonds, Morton, Barrows and Taylor
ATTORNEYS

United States Patent Office 3,007,155
Patented Oct. 31, 1961

3,007,155
GROUND CONTOUR MAPPING SYSTEM
Thracy Petrides and Leverett S. Tuckerman, Jr., New York, and Aaron M. Winzemer, Forest Hills, N.Y., assignors to U.S. Industries, Inc., New York, N.Y., a corporation of Delaware
Filed Apr. 17, 1959, Ser. No. 807,102
8 Claims. (Cl. 343—6)

This invention relates to aircraft ground contour mapping radar systems. More specifically, the invention relates to such a system adapted to be operated while airborne and which is capable of providing ground elevation and range information as well as planimetric mapping information for a wide strip of terrain passed over by the mapping aircraft.

In general, the improved airborne system of the present invention employs in combination an active side-looking pulsed radar system for the development of high resolution planimetric terrain mapping information signals, with a passive range finding radar system utilizing a narrow beam scanning antenna rotating about the roll-axis of the aircraft to receive energy from a succession of terrain patches illuminated by the side-looking radar. The height and range finding system provides an accurate measurement, in polar coordinate form, of the slant range and the angle of reception of each received pulse. This data when converted to cartesian coordinate form provides instantaneous ground range and height between the aircraft and scanned points on the mapped terrain. When correlated with aircraft navigational attitude and position data, an altitude reference and the aforementioned planimetric terrain mapping information, complete three coordinate information is thereby provided for the location of any scanned point on the mapped terrain with respect to any selected reference point.

It is a purpose of this invention to provide an airborne semi-active radar system with high resolution capability for ground contour mapping.

It is a further purpose of this invention to provide a digital ground range and height finding radar system combined with a digital navigational system the outputs of which may be used in a digital computer to afford rapid and precise position correlation with respect to any geographic reference point in space.

Another purpose of this invention is to provide a ground contour mapping system employing an active side-looking radar system to develop mapping information with time-base separation and a passive "monopulse" radar system employing antenna scanning about the roll-axis of the aircraft to develop correlated high resolution terrain height and range information.

Further understanding of this invention will be had from the following detailed description in conjunction with the accompanying drawings, wherein:

FIG. 1 is a perspective view of an aircraft carrying out a ground contour mapping operation using a semi-active radar system.

FIG. 2 is a top plan view of an aircraft showing the antenna arrangement of one embodiment of the invention.

FIG. 3 is a diagram showing the basic trigonometry involved in converting slant-range measurements in polar coordinate form to elevation and ground range values.

Figure 4:
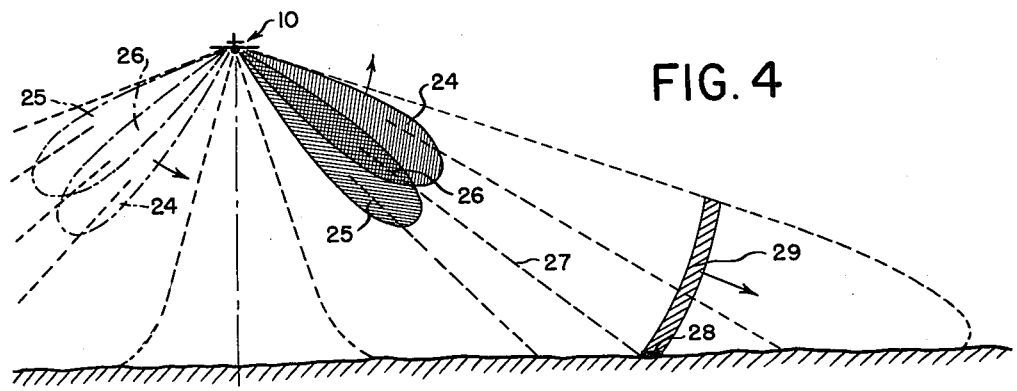
FIG. 4 is an elevation view showing the comparative beam angles of the active side-looking radar antennas and a passive rotating "monopulse" antenna.

Referring to the drawings, FIG. 1 is a perspective drawing depicting the general mode of operation of the present invention. A complete self-contained airborne ground-contour mapping radar system is carried by aircraft 10 to provide ground elevation and mapping information of a wide strip of terrain 11 passed over by the mapping aircraft. An active pulse modulated side-looking radar system illuminates very narrow strips of terrain 12, 12' with pulses of microwave energy along an axis transverse to the ground-track 13 of the aircraft. The active side-looking radar system should be capable of carrying out mapping operations throughout all types of weather conditions and therefore might advantageously operate on a frequency located between the X and K bands. A separate passive radar system is employed to operate in conjunction with the active side-looking mapping radar system in order to measure terrain height and range with respect to the aircraft. This radar receiver uses a scanning antenna which rotates about the roll-axis of the aircraft and which has a very narrow beam angle 14 in the vertical transverse plane for receiving reflected pulses of energy transmitted by the side-looking radar. High resolution terrain mapping information is developed by the active side-looking radar using time-base separation while high resolution range and height finding information is developed by the passive radar system using mechanical antenna scanning. Pulse energy is received by the passive radar system from a relatively small patch of terrain 15 with the system thereby affording a high degree of range and height resolution. An inherent advantage of the system lies in the fact that precise correlation between mapping and elevation information is automatically obtained. Further correlation of this information with respect to a ground observation point 16 in three coordinates (X, Y, Z) may be effected in a straight forward manner as will be explained more fully hereinafter.

FIG. 2 of the drawings shows one possible antenna embodiment in accordance with the teachings of this invention. The range and height finder antenna 17 comprises a pair of identical parabolic dish antennas mounted back-to-back in a nose radome 18 of the aircraft. These antennas are advantageously rotated continuously through 360° at a uniform predetermined speed about the roll-axis 37 of the supporting aircraft, however, other mechanical scanning arrangements may be used wherein the antenna is caused to reverse direction and oscillate back and forth periodically. The antennas have very narrow pencil-beam patterns with a high degree of angular discrimination in the transverse vertical plane and are employed to selectively receive pulsed microwave energy reflected from a small patch of terrain illuminated by the active-side-looking radar system. Associated with the rotating antenna system is a pick-off device 19 which generates an electrical output signal indicative of the antenna angular position.

A pair of side-looking radar antennas 20 are shown mounted on the side of the aircraft slightly rearward of the rotating antenna system. These antennas may be mounted in recesses along the sides of the fuselage and may advantageously be of the long linear array type so as to develop the necessary narrow horizontal beamwidth. The passive and active antenna systems are mounted with such proximity as to preclude any problem of parallax between the respective beams throughout the range of usable altitudes.

The trigonometry involved in converting the slant range measurement made in polar coordinate form by the passive range and height finder radar system to cartesian form is shown graphically in FIG. 3. The mapping aircraft 10 is shown flying at an absolute altitude H above a given horizontal reference plane (e.g. sea level) 22. Slant range $R_s$ between the aircraft and target area 21 is measured by the passive radar system by computing the echo return time for a given pulse transmitted by the side-looking radar system. Angle $\theta$ is the corresponding angle of reception as measured by the antenna pick-off device. The ground range X between the nadir point of the aircraft and the target point is calculated by multiplying $R_s$ by sine $\theta$ while the height $h$ of the aircraft with respect to the target area is obtained by multiplying $R_s$ by cosine $\theta$. Z represents the height of the target area with respect to the given horizontal reference 22 and is easily calculated by subtracting $h$ from H.

The distance $\Delta X$ measured along a recording reference plane 23 indicates the ground range error that would be introduced with the use of side-looking radar alone to measure terrain range.

The precision with which the actual ground height and range measurements can be achieved with the semi-active radar system used herein and the accuracy with which such data may be correlated with a remote point in space depends to a large extent on the complement of navigational instruments that is provided with the aircraft and on the short or long term accuracy and stability of such instruments. The basic minimum requirement in the way of navigational instruments that must be provided is an absolute altitude reference to provide the value H from which target elevation is derived. This instrument may be either of the inertial type or the doppler type. Its output should preferably be provided in numerical form.

To further enhance the usefulness and accuracy of the ground contour mapping system, inertial (e.g. "gyro") references may be mounted in the aircraft to develop pitch, roll and heading reference signals, preferably in numerical form also. Digital shaft coders may be used on the antenna as well as the pitch, roll and bearing "gyros" to convert angular shaft position to numerical form. These coders should preferably be of the optical, inductive or capacitive type so as to reduce torque loading on the "gyros" to a minimum.

Referring again to FIG. 3 it should be noted that the angle $\theta$ is properly corrected for roll-angle error by appropriately adding or subtracting the roll-angle error therefrom. Measurement errors due to changes in aircraft attitude about the other two axes may in similar fashion be compensated by simple triangulation computation.

An alternative approach for minimizing measurement errors due to changes in the aircraft attitude would be to provide an antenna mounting platform stabilized about one or more of the three aircraft attitude axes.

Figure 5:
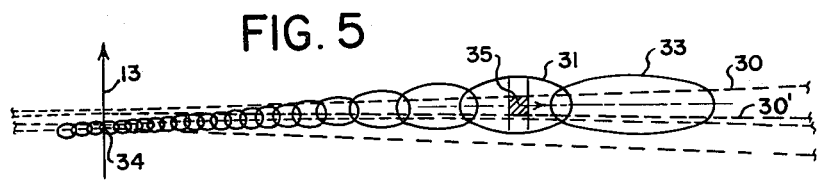
FIG. 5 is a fragmentary plan view of the terrain being mapped by a semi-active radar system showing the effective terrain area from which reflected energy is received on a pulse-by-pulse basis by the rotating height and range finding antenna.

The resolution of the height and range finding radar system afforded by this invention is primarily established by the effective beamwidth of the rotating antenna in the transverse vertical plane. FIGS. 4 and 5 indicate the resolution improvement that can be effected by the use of "monopulse" type radar in the passive system. The general theory of operation of "monopulse" radar is well known in the field and is particularly well described in the book entitled "Introduction To Monopulse" written by Donald R. Rhodes and published by McGraw-Hill Book Company, Inc., New York, 1959. Shaded areas 24 and 25 represent the two beam patterns for the respective feed pairs mounted in each rotating dish antenna. The overlap area 26 is centered along the boresight-axis 27 and a range pulse is generated in the monopulse receiver when pulse energy is received by the antenna from a small patch of terrain 28 illuminated by the pulse packet 29. Pulse packet 29, transmitted by the side-looking radar system travels outwardly with the speed of light illuminating a very narrow horizontal strip of terrain defined by dotted lines 30, 30' in FIG. 5. The series of ellipses 31 represent the patches of terrain from which the rotating passive range-finder antenna is able to receive energy on successive transmitted pulses. The ground sampling pattern shown in this drawing is developed by a counter-clockwise rotation of the antenna causing a left-to-right scansion of the terrain. The size and length of the ellipse increases as the antenna scanning moves outwardly from the ground track 13 due to the reduced angle of incidence of the beam with respect to the terrain. The outermost patch 33 is also advanced in the direction of flight with respect to patch 34 covering the ground track due to the forward velocity of the aircraft. Clearly the ground sampling pitch-angle and general distribution pattern will vary with the pulse repetition rate, the speed of rotation of the scanning antenna and the altitude and velocity of the transporting aircraft. The effect of increasing scan rate is to decrease the separation between successive rows of sampling and to increase the separation between ground patches within each row. For a given ground speed, altitude, and pulse repetition rate there is an optimum scan rate which will minimize the average separation between ground patches within the area of interest. The sampling interval in the flight direction may be easily computed by dividing the ground speed $V_g$ by the number of scans per second. If there are two antennas back-to-back, then the scan rate becomes $2f_r$ where $f_r$ is the number of antenna revolutions per second. Hence the track sampling interval is $$S_y = \frac{V_g}{2f_r}$$

For a given pulse repetition rate $f_p$ per second the antenna rotates through an angle $2\pi f_r/f_p$ between successive pulses and so the lateral sampling interval is $$S_x = \frac{2\pi f_r}{f_p} \times \frac{\text{slant range}}{\text{cosine } \theta}$$

The areas from which the scanning antenna is able to receive reflected energy is determined by the main lobe of the receiving pattern as is shown in FIG. 5, or the effective main lobe of the sum signal when a "monopulse" system is used. The areas from which the passive rotating antenna actually receives energy however is restricted to the narrow strip actually illuminated by the side-looking radar as defined by lines 30, 30' and further defined by ellipse 31. If "monopulse" techniques are employed then the area is still further restricted to shaded area 35 and the range and height finding resolution is thereby further enhanced.

Figure 6:
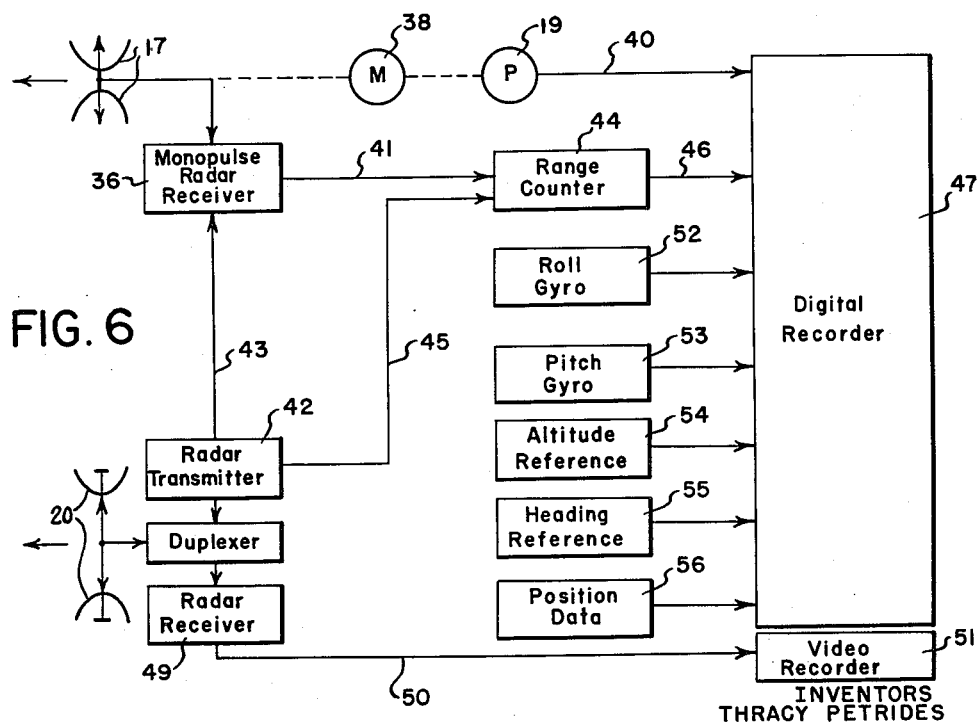
FIG. 6 is a block diagram of a semi-active ground contour mapping radar system combined with a digital navigational system adapted to provide signal information affording precise three coordinate geographic correlation with respect to a known reference point.

FIG. 6 shows a block diagram of the basic elements of an airborne semi-active radar ground contour mapping system. A passive monopulse radar receiver 36 is shown connected to a pair of rotating back-to-back dish antennas 17 which are driven by motor 38. Antenna pick-off unit 19 is a digital shaft coder which develops a digital output voltage on conductor 40 indicative of instantaneous antenna angular position.

The monopulse radar receiver produces a single output pulse on conductor 41 each time a reflected pulse is received by the rotating antenna. Receiver 36 is gated off during transmission by a gating pulse developed in the pulse modulator of the side-looking transmitter 42 and connected to the receiver by conductor 43. Range counter 44 may be a conventional binary counter which is turned on by the modulator trigger pulse fed from transmitter 42 via conductor 45 and then is turned off by the corresponding return echo pulse developed by "monopulse" receiver 36. Thus slant range is measured precisely in digital form and fed via conductor 46 to digital recorder 47 which may advantageously be in the form of a multiple channel magnetic tape recorder. Outputs of the navigational references shown namely, roll 52, pitch 53, altitude 54, heading 55 and position 56 are also developed in digital form. These navigational instruments may be either of the inertial or doppler type or a combination thereof and the outputs are all recorded simultaneously in digital form by recorder 47 along with the range counter output.

The pair of antennas shown at 20 are used for both transmission and reception in the active side-looking radar system. They may be of any well-known type, such as a long linear array, that is capable of developing the necessary narrow beam angle in the horizontal plane transverse the ground track. Radar receiver 49 is provided to develop terrain mapping information, which is fed in video output form (analog) via conductor 50 to video recorder 51 which may be either of the magnetic or photographic film type. The combined information recorded from the outputs of the respective navigational instruments, the side-looking radar and the height and range finding radar provides the necessary correlated data in three coordinate form to locate any point on the radar scanned terrain with respect to any arbitrary reference point in space.

It will be apparent to those skilled in the art that the ways in which the terrain data developed by the invention may be processed and utilized, either with airborne or ground-based equipment, will be limited only by the ingenuity of the user. For most practical purposes the angular and range measurements, as indicated, should be made by digital means (for purposes of accuracy and convenience of use with computers), however, in certain instances analog techniques may be used advantageously.

It will be understood that the embodiments shown and described are exemplary only, and that the scope of the invention will be determined by the appended claims. Although the use of a "monopulse" type radar receiver in the passive height and range finder system, as indicated, may be advantageous because of the enhancement of system resolution which it affords, it should be emphasized that the invention is not limited to this particular type system.

We claim:

1. A semi-active ground contour mapping radar system adapted to be operated on aircraft while airborne to produce a plurality of correlated signals for storage and ultimate display, comprising an active side-looking radar system including a transmitter for radiating a narrow horizontal beam of pulsed energy from the aircraft towards the earth's surface in a substantially vertical plane transverse the ground track of said aircraft, and a companion radar receiver for receiving pulsed energy reflected from the earth's surface to provide planimetric terrain mapping information signals; a passive radar system for receiving pulsed energy reflected from the earth's surface to provide ground height and range information, said system including a receiver scanning antenna mounted on said aircraft for rotation about the aircraft roll-axis and having a high degree of angular discrimination in the said vertical plane, and means for rotating said antenna; means coupled to said scanning antenna for producing an angle signal indicating the angle of reception of said pulsed energy, means for producing a range signal corresponding to the transit time of reflected pulsed energy transmitted by said active radar system and received by the said passive radar system, means for producing an altitude signal corresponding to the absolute altitude of said aircraft with respect to a predetermined reference plane, and means for storing each one of the said plurality of correlated signals.

2. The invention set forth in claim 1 characterized in that said passive radar system is of the "mono-pulse" type.

3. A semi-active ground contour mapping radar system adapted to be operated on aircraft while airborne to produce a plurality of correlated signals for storage and ultimate display, comprising an active side-looking radar system including a transmitter for radiating a narrow horizontal beam of pulsed energy from the aircraft towards the earth's surface in a substantially vertical plane transverse the ground track of said aircraft, and a companion radar receiver for receiving pulsed energy reflected from the earth's surface to provide planimetric terrain mapping information signals; a passive radar system for receiving pulsed energy reflected from the earth's surface to provide ground height and range information, said system including a receiver scanning antenna mounted on said aircraft for rotation about the aircraft roll-axis and having a high degree of angular discrimination in the said vertical plane, and means for rotating said antenna; means coupled to said scanning antenna for producing an angle signal in digital form corresponding to the angle of reception of said pulsed energy, means for producing a range signal in digital form corresponding to the transit time of reflected pulsed energy transmitted by said active radar system and received by the said passive radar system, means for producing an altitude signal in digital form corresponding to the absolute altitude of said aircraft with respect to a predetermined reference plane, and means for storing each one of the said plurality of correlated signals.

4. A semi-active ground contour mapping radar system adapted to be operated on aircraft while airborne to produce a plurality of correlated signals for storage and ultimate display, comprising an active side-looking radar system including a transmitter for radiating a narrow horizontal beam of pulsed energy from the aircraft towards the earth's surface in a substantially vertical plane transverse the ground track of said aircraft, and a companion radar receiver for receiving pulsed energy reflected from the earth's surface to provide planimetric terrain mapping information signals; a passive radar system for receiving pulsed energy reflected from the earth's surface to provide ground height and range information, said system including a receiver scanning antenna mounted on said aircraft for rotation about the aircraft roll-axis and having a high degree of angular discrimination in the said vertical plane, and means for rotating said antenna; means coupled to said scanning antenna for producing an angle signal indicating the angle of reception of said pulsed energy, means for producing a range signal corresponding to the transit time of reflected pulsed energy transmitted by said active radar system and received by the said passive radar system, means for producing an altitude signal corresponding to the absolute altitude of said aircraft with respect to a predetermined reference plane, means for producing a signal corresponding to the roll-angle of said aircraft, and means for storing each one of the said plurality of correlated signals.

5. A semi-active ground contour mapping radar system adapted to be operated on aircraft while airborne to produce a plurality of correlated signals for storage and ultimate display, comprising an active side-looking radar system including a transmitter for radiating a narrow horizontal beam of pulsed energy from the aircraft towards the earth's surface in a substantially vertical plane transverse the ground track of said aircraft, and a companion radar receiver for receiving pulsed energy reflected from the earth's surface to provide planimetric terrain mapping information signals; a passive radar system for receiving pulsed energy reflected from the earth's surface to provide ground height and range information, said system including a receiver scanning antenna mounted on said aircraft for rotation about the aircraft roll-axis and having a high degree of angular discrimination in the said vertical plane, and means for rotating said antenna; means coupled to said scanning antenna for producing an angle signal indicating the angle of reception of said pulsed energy, means for producing a range signal corresponding to the transit time of reflected pulsed energy transmitted by said active radar system and received by the said passive radar system, means for producing an altitude signal corresponding to the absolute altitude of said aircraft with respect to a predetermined reference plane, means for producing a signal corresponding to the roll-angle of said aircraft, means for producing a signal corresponding to the pitch-angle of said aircraft, and means for storing each one of the said plurality of correlated signals.

6. A semi-active ground contour mapping radar system adapted to be operated on aircraft while airborne to produce a plurality of correlated signals for storage and ultimate display, comprising an active side-looking radar system including a transmitter for radiating a narrow horizontal beam of pulsed energy from the aircraft towards the earth's surface in a substantially vertical plane transverse the ground track of said aircraft, and a companion radar receiver for receiving pulsed energy reflected from the earth's surface to provide planimetric terrain mapping information signals; a passive radar system for receiving pulsed energy reflected from the earth's surface to provide ground height and range information, said system including a receiver scanning antenna mounted on said aircraft for rotation about the aircraft roll-axis and having a high degree of angular discrimination in the said vertical plane, and means for rotating said antenna; means coupled to said scanning antenna for producing an angle signal indicating the angle of reception of said pulsed energy, means for producing a range signal corresponding to the transit time of reflected pulsed energy transmitted by said active radar system and received by the said passive radar system, means for producing an altitude signal corresponding to the absolute altitude of said aircraft with respect to a predetermined reference plane, means for producing a signal corresponding to the roll-angle of said aircraft, means for producing a signal corresponding to the pitch-angle of said aircraft, means for producing a signal corresponding to the heading-angle of said aircraft, and means for storing each one of the said plurality of correlated signals.

7. A semi-active ground contour mapping radar system adapted to be operated on aircraft while airborne to produce a plurality of correlated signals for storage and ultimate display, comprising an active side-looking radar system including a transmitter for radiating a narrow horizontal beam of pulsed energy from the aircraft towards the earth's surface in a substantially vertical plane transverse the ground track of said aircraft, and a companion radar receiver for receiving pulsed energy reflected from the earth's surface to provide planimetric terrain mapping information signals; a passive radar system for receiving pulsed energy reflected from the earth's surface to provide ground height and range information, said system including a receiver scanning antenna mounted on said aircraft for rotation about the aircraft roll-axis and having a high degree of angular discrimination in the said vertical plane, and means for rotating said antenna; means coupled to said scanning antenna for producing an angle signal indicating the angle of reception of said pulsed energy, means for producing a range signal corresponding to the transit time of reflected pulsed energy transmitted by said active radar system and received by the said passive radar system, means for producing an altitude signal corresponding to the absolute altitude of said aircraft with respect to a predetermined reference plane, means for producing a signal corresponding to the roll-angle of said aircraft, means for producing a signal corresponding to the pitch-angle of said aircraft, means for producing a signal corresponding to the heading-angle of said aircraft, navigational means for producing signals corresponding to aircraft range and aircraft bearing with respect to a known reference point, and means for storing each one of the said plurality of correlated signals.

8. The invention set forth in claim 7 characterized in that said planimetric terrain mapping signals are produced in analog form and all other signals are produced in digital form.

References Cited in the file of this patent

UNITED STATES PATENTS

| | | |
|---|---|---|
| 2,430,307 | Smith | Nov. 4, 1947 |
| 2,513,314 | Hawkins | July 4, 1950 |
| 2,613,352 | Kellogg | Oct. 7, 1952 |
| 2,753,552 | Hom | July 3, 1956 |
| 2,787,428 | Schuck | Apr. 2, 1957 |